United States Patent [19]
Yoo

[11] 3,768,201
[45] Oct. 30, 1973

[54] METHOD OF SPROUTING BEANS

[76] Inventor: Byong W. Yoo, 4320 Rowalt Drive, # 102 College Park, Md. 20740

[22] Filed: Nov. 7, 1972

[21] Appl. No.: 304,477

[52] U.S. Cl. .................................. 47/16, 47/1.2
[51] Int. Cl. ................................ A01g 31/02
[58] Field of Search .................. 47/14, 16, 1.2

[56] References Cited
UNITED STATES PATENTS

| | | |
|---|---|---|
| 2,296,849 | 9/1942 | Hammerstrom et al. ............ 47/16 |
| 2,436,652 | 2/1948 | Lee ...................................... 47/1.2 |
| 3,328,912 | 7/1967 | Poon .................................... 47/1.2 |
| 3,458,951 | 8/1969 | Martin ................................ 47/1.2 |
| 3,616,560 | 11/1971 | Mun .................................... 47/1.2 |
| 3,643,376 | 2/1972 | Poindexter et al. ................. 47/1.2 |

Primary Examiner—Robert E. Bagwill

[57] ABSTRACT

This invention relates to a method of and apparatus for producing bean sprouts by subjecting seeds to timed sprays of heated water, which water is recycled throughout the spraying until the seeds have sprouted.

4 Claims, 1 Drawing Figure

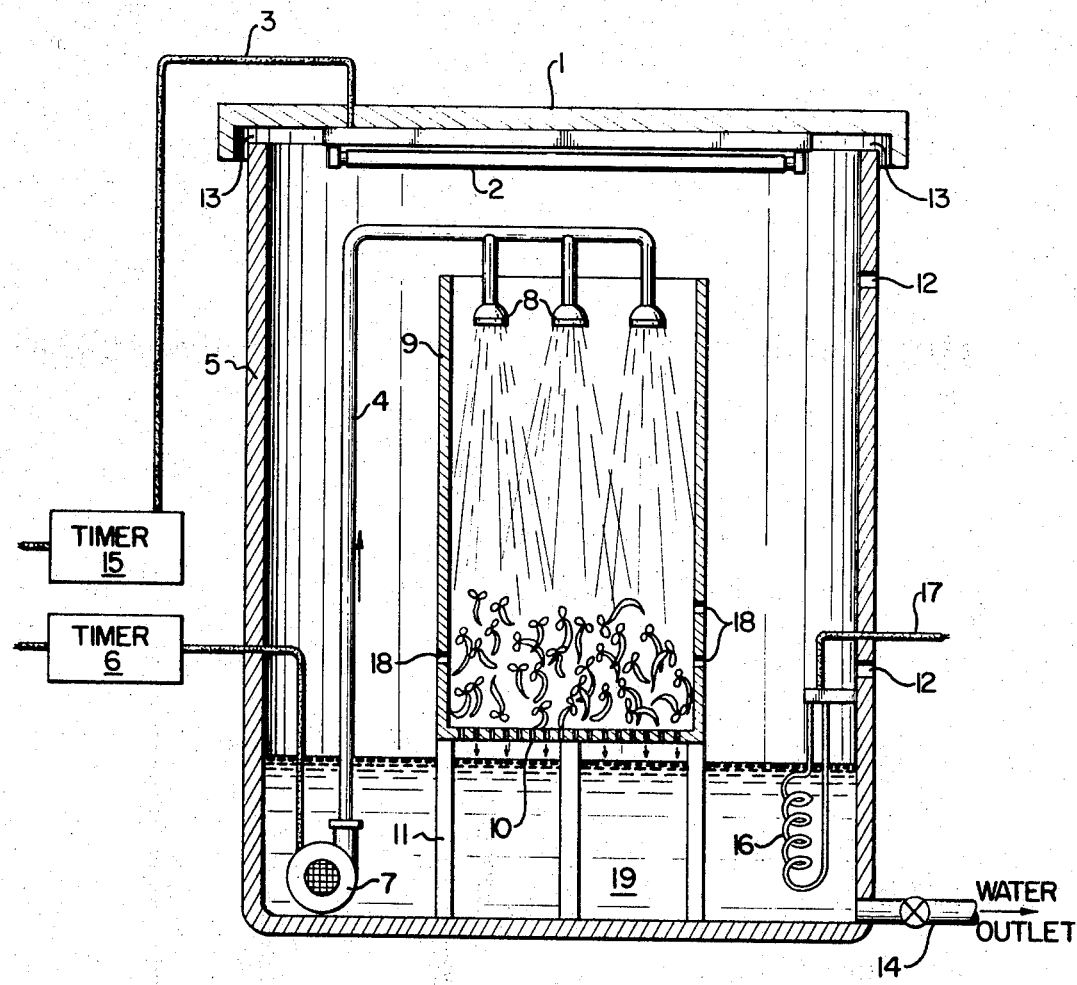

METHOD OF SPROUTING BEANS

This invention relates to a method of and apparatus for producing bean sprouts by subjecting seeds to timed sprays of heated water, which water is recycled throughout the spraying until the seeds have sprouted.

My invention relates to improvements in the production of seed sprouts such as Mung Beans, Soybeans, Alfalfa or any other type of seed and vegetables like radish, turnip, or sweet potato.

Bean sprouts, from soy or mung bean are usually grown commercially and then distributed to oriental groceries, oriental restaurants, canneries or health food stores. These sprouts and green vegetables which are water-cultured are easily perishable and loose their nutritional and commercial values. Ideally with my method and aparatus anyone can produce these sprouts and vegetables for his own use from small to large scale. Normally, bean sprouts need a week to grow to the state where they can be marketed or consumed, but with my methods and aparatus this production time can be reduced by 50% or more, by recycled water spraying from 2 to 4 minutes every 5 to 30 minutes, and by controlling water and sprouting vat temperatures at 72° to 84°F. Ideal size and shape of bean sprouts can be easily obtained in 2½ – 3 days.

By recycling water, some of unknown growth factors released during germination can be resupplied and used for stimulation of growth. Recycling prevents the nutrients from washing away and helps to maintain constant temperature for sprouting and growing.

Ideal shape can be easily obtained by controlling the ventilation system. Environment and conditions of production required for soybean sprouts are different from that of mung bean sprouts. With my methods conditions required for both these types of sprouts can be controlled. By adjustment of spraying time and water and sprouting vat temperature, microbial problems can also be controlled. Sometimes sodium hypochlorite or calcium hypochlorite solutions may be added in the range of 0 – 300 PPM. to discourage the undesirable microbial acrivities.

The prime object of my invention is to provide a method and apparatus for producing bean sprouts and other green vegetables having desirable size and quality with a simple automatic method in shortest period of time. Sprouting vat and water container can be easily washed and sterilized frequently. With my method and machine any family can easily provide cheap Vitamin C all year around using only 2-4 square feet spare space in house. Canneries can produce large amounts of sprout with same applications. It is alleged by some that Vitamin C prevents or cures colds.

The FIGURE is a schematic view in vertical section of a bean sprouting machine. Housing 5 contains water and present substantially light limited, which can be built with any kind of metal, alloy, plastic compounds, or wood treated for prevention of bacterial growth. Housing 5 can also be built with transparent materials such as glass or any other compounds. The container 9 is smaller than the housing 5 to provide a space between housing 5 and container 9 for the circulation of air which may enter as through openings 12 and 13. A cover or lid 1 closes the top of the housing 5 and a container 9 in which beans to be sprouted or bulb or root to be budding for green vegetables is disposed within the housing and supported in spaced relation to the bottom of the housing by leg 11. Leg 11 can be easily removed from the housing, and container 9 can be placed on the bottom of the inside of housing for soaking bean seeds or plant or bulbs. Bottom of the container 10 has holes with which water will be drained through and side holes 18 help the aeration which is necessary for respiration and rapid growth of certain beans and vegetables.

Water is pumped by water pump 7 and water is transfered through water hose 4 and sprayed by nozzle 8. Sprayed water is retained on the bottom of the housing 19 and is recycled. Timer 6 is connected with pump and controls pumping and spraying time and intervals. Timer 15 controls the lighting time of the lighting bulb 2 that helps photosynthesis for green vegetables. Water temperature can be controlled by thermostatic heater 16 which is connected to electric line 17. Housing 5, cover 1 and container 9 can be built with the opaque materials to prevent any substantial light for bean sprouts, and by controlled light, green vegetables can be grown. Housing 5, cover 1 and container 9 can be built with transparent materials that can provide light for green vegetables and can be covered with opaque cover for bean sprout production. Water can be drained using valve 14 or can be poured away depending on the size of housing.

Having thus disclosed my invention, I claim:

1. A machine for sprouting seeds comprising a housing having sides and a bottom wall integral therewith, there being at least one ventilation hole is said side walls, a cover resting on said housing said housing being watertight throughout the lower portion thereof and adapted to contain a predetermined supply of water therein, a sprouting vat having side walls and a perforate bottom wall, said vat being adapted to hold a supply of seed therein, at least one spray means mounted within said housing and positioned to spray said seeds, pump means in said housing in fluid communication with said spray means and said housing lower portion, said pump means being connected to a timer adapted to sequentially energize the same to spray the seeds for predetermined periods, said vat resting on a support means extending from the housing bottom wall, the perforate bottom wall being spaced above the upper level of said water supply.

2. An apparatus according to claim 1 and further comprising a light source mounted within said housing and connected to said timer and energizable thereby.

3. An apparatus according to claim 1 and further including heating means mounted within said housing for heating said water supply.

4. A method of sprouting beans selected from the group consisting of mung beans and soy beans, comprising subjecting said beans to a recycled water spray, the temperature of said water being from approximately 72° – 84°F, said water being sprayed for 2 to 4 minutes at intervals ranging from 5 to 30 minutes.

* * * * *